United States Patent [19]
Ehrenfreund

[11] 3,755,208

[45] Aug. 28, 1973

[54] AVOIDANCE OF CELL COLLAPSE IN AN EXTRUSION PROCESS FOR A COPOLYMER BASED ON A LOW MOLECULAR WEIGHT α-OLEFIN AND POLAR VINYL MONOMER

[75] Inventor: Herbert A. Ehrenfreund, Madison, Conn.

[73] Assignee: Haskon, Inc., Wilmington, Del.

[22] Filed: Oct. 23, 1970

[21] Appl. No.: 83,644

Related U.S. Application Data

[63] Continuation-in-part of Ser. No. 706,612, Feb. 19, 1968, abandoned.

[52] U.S. Cl. ............ 260/2.5 E, 260/23 H, 260/31.6, 260/41 A, 260/86.7, 260/88.1 PC, 264/53, 264/DIG. 5, 264/DIG. 13
[51] Int. Cl. ........................ C08f 45/00, C08f 47/10
[58] Field of Search ..................... 260/2.5 B, 45.85, 260/31.6, 2.5 E, 23 H, 86.7, 88.1 PC; 264/53, DIG. 5, DIG. 13

[56] References Cited
UNITED STATES PATENTS

| | | | |
|---|---|---|---|
| 3,644,230 | 2/1972 | Cronin | 260/2.5 E |
| 3,067,147 | 12/1962 | Rubens et al. | 264/53 X |
| 3,222,304 | 12/1965 | Ingram | 260/2.5 R |
| 3,177,174 | 4/1965 | Tirpak | 260/31.6 X |
| 3,461,088 | 8/1969 | Stahnecker et al. | 264/53 X |
| 3,541,040 | 11/1970 | Eastes et al. | 260/31.6 |

OTHER PUBLICATIONS

Lasman, Henry R. "Blowing Agents." Wilmington, Mass., National Polychemicals, Pages 547–550. (Reprinted from Encyclopedia of Polymer Science and Technology, Vol. 2, Pages 532–565, 1965).

*Primary Examiner*—Philip E. Anderson
*Attorney*—Edwin H. Dafter

[57] ABSTRACT

Post extrusion cell collapse of vinyl copolymer foams is prevented by incorporation of a small amount of a partial ester of a long chain fatty acid and a polyol.

2 Claims, No Drawings

AVOIDANCE OF CELL COLLAPSE IN AN EXTRUSION PROCESS FOR A COPOLYMER BASED ON A LOW MOLECULAR WEIGHT α-OLEFIN AND POLAR VINYL MONOMER

This application is a continuation-in-part of U.S. Application Ser. No. 706,612, filed Feb. 19, 1968 and now abandoned.

This invention relates to an improved process for the extrusion of foams of thermoplastic materials and to the foams produced thereby.

Small celled polymer foams are light-weight, low density materials which have many attractive commercial uses. In the past, most of this material has been prepared by compression molding or other techniques wherein foaming takes place within a confined volume, as in a shaping die. More recently the art has been moving in the direction of forming such foamed structures by extrusion since there are well known economic advantages to be realized from extrusion processes.

In the typical foam extrusion process, the polymer, with mixing aids, stabilizers, and other additives, is melted in the melting section of an extruder and an inert, low boiling hydrocarbon foaming or blowing agent is added thru the extruder barrel, under pressure, to the molten polymer. When the polymer is subsequently extruded, the decrease in pressure on the molten polymer causes the liquid to vaporize and expand, with resultant cell formation in the polymer.

Preparation of foam by extrusion, however, is a sensitive process since, with usually no provision for confining the foam, there is a tendency for the liquid blowing agent simply to boil away, passing out through the molten polymer. As a result, the foam collapses, either completely or partially and increases in density to an undesirable level.

In accordance with this invention, it has been found that cell collapse in extruded foams of polar vinyl copolymers can be substantially reduced or eliminated if there is added to the polymer to be extruded 0.1 to 10 percent by weight, based on polymer weight, of a partial ester of a fatty acid of about 12 to 18 carbon atoms and a polyol having 3 to 6 hydroxyl groups. The invention, then, is the improvement in the extrusion process for preparing foams of copolymers based on a low molecular weight α-olefin and a polar vinyl monomer using low boiling hydrocarbon blowing agents which comprises extruding such a copolymer having incorporated therein, in addition to the aforesaid hydrocarbon, 0.1 to 10 percent, preferably 0.1 to 3 percent, based on the weight of the copolymer, of a partial ester of a fatty acid of about 12 to 18 carbon atoms and a polyol having 3 to 6 hydroxyl groups.

The process of the invention is applicable to the preparation of foams of any copolymer based on a low molecular weight α-olefin and a polar vinyl monomer which can otherwise be employed in foaming processes. This includes, e.g., ethylene--vinyl acetate copolymer, ethylene-ethyl acrylate copolymer, ethylene--vinyl chloride copolymer, and metallic salts of copolymers of ethylene and unsaturated carboxylic acids such as the zinc or sodium salts of ethylene--acrylic acid copolymer. Such materials are commercially available and can be used to prepare useful foam compositions. Foams of the above copolymers having extremely low bulk density, e.g., less than 10 pounds per cubic foot can readily be prepared using the process of this invention.

The partial esters of fatty acids which are used to prevent cell collapse of extruded polyolefin foams according to this invention are members of a generic class known as surface active agents or surfactants. Exemplary surfactants in the class of useful additives include, for example, glyceryl monostearate, glyceryl distearate, mixtures of these mono- and diglycerides, sorbitan mono-, di-, and tri-oleates, and mono- and diglycerides of oleic acid and palmitic acid, inter alia.

The reasons for the efficacy of the partial esters of the specified polyols in stabilizing foams is not known for certain. However, it has been postulated that there is a relationship between the solubility of the surfactant in hydrocarbons at low temperature and the ability to prevent foam collapse. It has been suggested that the surfactant must be at low temperatures in order to form a barrier to impede the escape of the hydrocarbon blowing agent from the polymer. This is not, however, intended as a limiting theory.

The blowing agent which is employed in the process of this invention can be any hydrocarbon which boils below the melting point of the polar copolymer. This includes such compounds as pentane, hexane, heptane, and octane. Also, halogenated hydrocarbons which meet the same limitations as to boiling point can be used as, e.g., methylene chloride, dichloroethane, chlorodifluoroethane, tetrafluoroethane, and similar halogenated hydrocarbons. Mixtures of these materials are also useful.

In addition to the specified surfactant and blowing agent, the foamable composition will also usually contain small amounts of a metallic soap such as zinc stearate and a finely divided inorganic material such as calcium silicate as lubricants and cell nucleating agents. These materials are used in small amounts, e.g., a combined total of about 0.2 to 2 percent by weight based on polymer weight. It is found that their presence contributes to the attainment of uniform small cell size in most cases.

By small cell foam, it is intended to indicate a foam having cells of about 2 millimeters or less average diameter. Cells of this small diameter are preferred since this type of foam is usually more resilient than one having larger cells. Additionally, smaller cells lead to smoother skin on the foam.

The extrusion of the foam is effected in any known way by means of either single or double screw extruders. Equipment of this type is standard and commercially available, and forms no part of this invention.

The improved process of this invention is applicable to the production of foamed articles of any shape which can conveniently be formed by extrusion, for example, sheets, rods, tubes, and wire or cable coatings. The resulting closed-cell foam structures are characterized by good thermal insulation properties and light-weight.

In addition to the blowing agent, the polymer employed in this invention can, and usually will, contain other additives for other purposes, for example, a small amount of a heat or light stabilizer and an antioxidant to prevent degradation during processing. Pigments, plasticizers, nucleating agents, and mixing aids are also frequently employed. The process is operable with any of such aids in the customary quantities.

EXAMPLE 1

A foamable composition was prepared containing 50 parts of a copolymer of about 93 percent ethylene and 7 percent vinyl acetate having a melt index of about 2, 0.2 part zinc stearate, 0.4 part calcium silicate and 0.4 part of a mixture of glycerol mono- and distearate sold commercially under trade name Atmos 150. This mixture was extruded thru a 2-1/2 inch single screw extruder fitted with a round hole die. Temperature was controlled across the extruder in 5 zones and the die, as follows: first zone 166° C., second zone 160° C., third zone 157° C., fourth zone 157° C., fifth zone 116° C.; and at the die 88° C. Between the first and second zones, there was introduced 3.5 parts liquid hexane and 3.5 parts dichlorodifluoromethane under pressure of 2850 psi.

On emerging from the die, the composition immediately expanded to a foamed rod about 0.77 inch in diameter. After cooling, this had shrunk to 0.70 inch and after 48 hours, was still 0.70 inch. The density of this foam was about 8.2 pounds per cubic foot.

When a control for the above test was run, omitting the glycerol mono- and di- stearate mixture, the foam initially expanded to the same diameter, but upon cooling it shrunk to 0.60 inch and after 48 hours, it had further shrunk to about 0.45 inch. The density measured after 48 hours was about 13.2 pounds per cubic foot.

EXAMPLE 2

A composition similar to that of Example 1 was prepared containing 0.2 parts of glycerol monostearate in place of the mixed glycerides of Example 1, using heptane and dichlorodifluoromethane as blowing agents. The extruder in this instance was staged as follows: 165° C., 160° C., 154° C., 154° C., 116° C., and 92° C.

The resulting foamed rod had initial diameter of 0.75 inch, 0.70 after cooling and 0.70 after 48 hours. Its density was 8.1 pounds per cubic foot.

EXAMPLE 3

Another foamable composition was prepared wherein the fatty acid ester was sorbitan monostearate. This was extruded through the same extruder having the following temperature zones: 165° C., 160° C., 157° C., 155° C., 116° C., and 88° C., at the die. Foamed rod produced from this formulation had initial diameter of 0.80 inch, 0.63 after cooling, and 0.63 after 48 hours. Its density was 5.6 pounds per cubic foot.

EXAMPLE 4

The foamable composition in this example was comprised of 50 parts of the sodium salt of a copolymer of about 90 percent ethylene with 10 percent acrylic acid, 0.4 part of the mixed glycerol di- and mono- stearate, 0.4 part zinc stearate and 0.2 part calcium silicate. This was fed thru the same extruder and a mixture of 3.5 parts hexane and 7 parts dichlorodifluoromethane was added to form foamed rod. The extruder was temperature staged as follows: 166° C., 177° C., 154° C., 160° C., 120° C., and at the die 88° C. The resulting foamed rod had initial diameter of 0.87 after cooling 0.82, and after 48 hours 0.82. Its density was 4.6 pounds per cubic foot.

EXAMPLE 5

A foamable composition was prepared containing 50 parts of a copolymer of 93 percent ethylene and 7 percent vinyl acetate, 5 parts of the sodium salt of ethylene--acrylic acid copolymer, 0.4 part of mixed glycerol mono- and di- stearate, 0.25 part zinc stearate and 0.4 part calcium silicate. This was extruded thru a 2-1/2 extruder and a round hole die to form a foamed rod. The temperature profile of the extruder was 166° C., 160° C., 157° C., 157° C., 116° C., and 88° C., at the die. The resulting rod was about 0.60 inches immediately after extrusion, and about 0.55 after cooling. Its density was about 9.9 pounds per cubic foot.

EXAMPLE 6

The foamable composition in this example was comprised of 50 parts of a copolymer of 8 percent ethyl acrylate and 92 percent ethylene, 0.4 part sorbitan monooleate, 0.2 part zinc stearate and 0.2 part calcium silicate. This was extruded into foamed rods using the same extruder and same temperature profile as was used in Example 1 with 3.5 parts hexane and 7.0 parts dichlorodifluoromethane as the blowing agent. The foamed rod was 0.77 inch in diameter initially and shrunk to 0.70 inch on cooling. Its density was 8.6 pounds per cubic foot.

What I claim and desire to protect by letters Patent is:

1. In an extrusion process comprising: admixing in the extruder a copolymer selected from the group consisting of ethylene--vinyl acetate copolymer, ethylene---ethyl acrylate copolymer, ethylene--vinyl chloride copolymer and the metallic salts of ethylene--acrylic acid copolymers, a low boiling blowing agent selected from the group consisting of (a) hydrocarbons, (b) halogenated hydrocarbons, and (c) mixtures of (a) and (b), and a nucleating agent comprising a finely divided inorganic material, the improvement of adding 0.1 to 10 percent based on the weight of the polymer, of a partial ester of a fatty acid having 12 to 18 carbon atoms and a polyol having 3 to 6 hydroxyl groups, and extruding a foam of said copolymer which has a density of no greater than 10 pounds per cubic foot.

2. The process of claim 1 where the partial ester is a mixture of glycerol monostearate and glycerol distearate.

* * * * *